(12) United States Patent
Nelson et al.

(10) Patent No.: US 6,288,839 B1
(45) Date of Patent: Sep. 11, 2001

(54) REPLACEMENT ASSEMBLY FOR AN IMAGE INTENSIFIER TUBE UTILIZING AN INPUT RELAY LENS

(75) Inventors: John C. Nelson, Salem; Albert W. Efkeman, Roanoke; Don J. Janezco, Fincastle; Roderick L. Snyder, Vinton; Vincent Thomas, Roanoke, all of VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/610,492

(22) Filed: Jul. 5, 2000

(51) Int. Cl.[7] .............................. G02B 23/00; H01J 31/50
(52) U.S. Cl. .................... 359/409; 359/399; 250/214 VT
(58) Field of Search ..................... 359/350–351, 359/353, 399–400, 355–362, 434–435, 630, 634; 385/116, 120, 353; 250/214 VT; 313/524–530; 348/217, 335, 361

(56) References Cited

U.S. PATENT DOCUMENTS

| | | | |
|---|---|---|---|
| 4,134,009 | 1/1979 | Dippold | 250/205 |
| 5,029,963 | 7/1991 | Naselli et al. | 385/116 |
| 5,305,142 | 4/1994 | Phillips et al. | 359/435 |
| 5,528,418 | * 6/1996 | Bowman, Jr. | 359/400 |
| 5,604,630 | * 2/1997 | Palmer | 359/409 |
| 5,796,516 | * 8/1998 | Palmer | 359/399 |
| 5,946,132 | 8/1999 | Phillips | 359/351 |
| 5,973,315 | * 10/1999 | Saldana et al. | 250/214 VT |

* cited by examiner

Primary Examiner—Thong Nguyen

(57) ABSTRACT

A Gen III retrofit package for a Gen II image intensifier which utilizes a 1:1 relay lens in front of the Gen III tube to focus an inverted image on the far side of a glass plate where the photocathode is located.

6 Claims, 1 Drawing Sheet

REPLACEMENT ASSEMBLY FOR AN IMAGE INTENSIFIER TUBE UTILIZING AN INPUT RELAY LENS

FIELD OF THE INVENTION

The present invention relates to a Generation III image intensifier assembly that can be substituted for the previously employed Generation II image intensifier used in a number of different night vision devices.

BACKGROUND OF THE INVENTION

Image intensifier tubes are well known in the industry by their commonly used names, based on the generic generation from which their design came into being. The tubes have evolved from Generation 0 to the current Generation III. These tubes have typically been produced in both 18 mm and 25 mm diameter formats.

A significant portion of the military and commercial night vision equipment currently in use was designed to physically accommodate a 25 mm format Generation II (Gen II) image intensifier tube. The military equipment that uses the Gen II tube, includes Individual Served Weapon Sights, Crew Served Weapon Sights, night vision devices that facilitate the operation of motorcraft in low light conditions and for other applications as well.

The Gen II image intensifier tube conforms to detailed U.S. military specifications, and is identified by its U.S. military part number: MX-9644. The performance of the Gen II image intensifier tube is no longer the state of the art. The Gen II image intensifier tube is an inverter tube and exhibits a gain at $6 \times 10^{-6}$ foot candles input of from 20,000 to 70,000 with a typical gain of 50,000. The photocathode of a Gen II tube exhibits a luminous sensitivity of approximately 325 microamps per lumen at 2856 K. The Gen II image intensifier tube exhibits a signal-to-noise ratio of approximately 4:1 and a resolution of twenty eight line pairs per millimeter (lp/mm).

A higher performance image intensifier tube has been developed in the Generation III (Gen III) proximity focused image intensifier tube. A Gen III image intensifier tube employs a gallium arsenide photocathode which has an improved photosensitivity that operates at starlight levels and below. A Gen III image intensifier device, with a glass output screen, exhibits a luminous gain in the range of 20,000 to 70,000 at 2.0×10 thus −6 foot candles. The sensitivity of the Gen III photocathode is over 1000 microamps per lumen at 2856 K., which is more that three times that of the Gen II tube. The signal-to-noise ratio has been increased to approximately 16:1, and the resolution, to 36–40 lp/mm.

Generation III (Gen III) is a generic term established by the United States Department of the Army at its Night Vision Labs at Fort Bellmore. The Gen III image intensifier tube is identified by Military Part Number MX-10160. The criteria set forth by the Department of the Army in distinguishing a Gen III tube from a MX-9644 Gen II tube is that a Gen III tube utilizes a gallium arsenide photocathode and an ion barrier film over the microchannel plate, while the Gen II tube does not.

In view of the above performance statistics it should be obvious that the Gen III image intensifier tube is more desirable that the Gen II image intensifier tube, and the Gen III tube should be substituted for the Gen II tube wherever possible. However, certain problems arise when such a substitution is attempted. As has been previously mentioned, many night vision applications were designed and built around the Gen II image intensifier tube. In such applications the size and shape of the night vision device was formed to enclose the Gen II tube. Additionally, the objective lens optics and the eyepiece optics were designed to complement the input and output of the Gen II tube.

Additionally, in order to operate properly and form a sharp image across the field of a 25 mm Gen II Electrostatically focusable image intensifier tube, the photocathode surface had to be curved. To accommodate this curvature, the image tube input faceplate was constructed of fiber optics. In 25 mm Gen III wafer tubes, the photocathode can be flat and thus be applied to the inside of a flat glass input plate. Use of a glass plate input faceplate further improves tube sensitivity. In contrast to an electrostatic tube, a wafer tube requires a fiber optic twist/extender for image inversion. Therefore, to make a Gen III retrofit tube for the Gen II electrostatic in the prior art required two modifications to a normal 25 mm wafer tube. First, the Gen III photocathode was placed on a fiber optic input window to accommodate the presently fielded devices' objective lenses (these lenses are not designed to focus through the glass faceplate). Second, a fiber optic twist/extender was added to the output of the wafer tube to invert the image and to make up for the optical and physical length of the Gen II electrostatic tube. These modifications add weight and reduce optical performance. Tubes that use this approach are the ITT Models F4848 and F9860, which meet the performance and physical requirements of the U.S. Government MX-11619 and MX-11620 image intensifier tubes.

Because of the modifications made to the Gen III wafer tube in the prior art to be a form, fit and function retrofit tube, the various devices cannot benefit from the full performance increase offered by Gen III technology. A major shortcoming is that the image formed by the various devices' objective lenses must fall on a fiber optic input faceplate. The fiber optic faceplate reduces the inherently high photocathode sensitivity, while photocathode sensitivity is a major driver for low light level performance. Another shortcoming is that the fiber optic twist/extender must be longer than needed to duplicate the optical and physical length of the Gen II electrostatic tube. This added length of fiber optics adds unnecessary weight to the device.

SUMMARY OF THE INVENTION

The approach of the present invention to making a Gen III tube fit into a package that will be a form fit and function retrofit for the Gen II electrostatic image tube is unique. The fiber optic invention twist/extender is replaced with a 1:1 relay lens. This relay lens is placed in front of the tube rather than behind it. The 1:1 relay lens is designed to relay the image in air formed by the devices' objective lenses to an inverted image focused on the rear surface of a glass tube input plate. Using a relay lens in this fashion reduces the tube weight, since relay lens optical elements are lighter than a solid slug of glass fiber optics, and improves tube sensitivity, since the photocathode on glass is more sensitive than the photocathode on fiber optic.

BRIEF DESCRIPTION OF DRAWINGS

The invention will be better understood by referring to the accompanying drawings herein.

DETAILED DESCRIPTION OF PREFERRED EMBODIMENT

Figure 1:
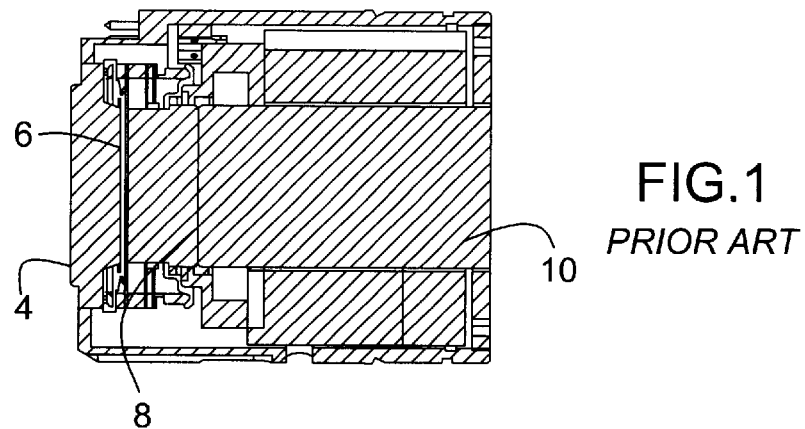
FIG. 1 shows a prior art retrofit assembly.

FIG. 1 shows a prior art retrofit image intensifier tube assembly. The photocathode 4 is comprised of a curved fiber optics input surface to which the photosensitive electron emitting material is applied. As mentioned above, the fiber optics are necessary because the objective fielded for use with the Gen II tube is not designed to focus through a glass plate, as is found in a Gen III device.

The remainder of the image intensifier tube structure of FIG. 1 is that of a Gen III tube, including microchannel plate 6 and screen fiber optic 8. However, a lengthy inverting fiber optic twist extender 10 is necessary to invert the Gen III image for use with a fielded eyepiece designed for Gen II and to make up for the optical and physical length of the Gen II tube. As discussed above, disadvantages of this retrofit approach are that the fiber optic faceplate reduces photocathode sensitivity and the fiber optic twist/extender adds significant weight to the device.

Figure 2:
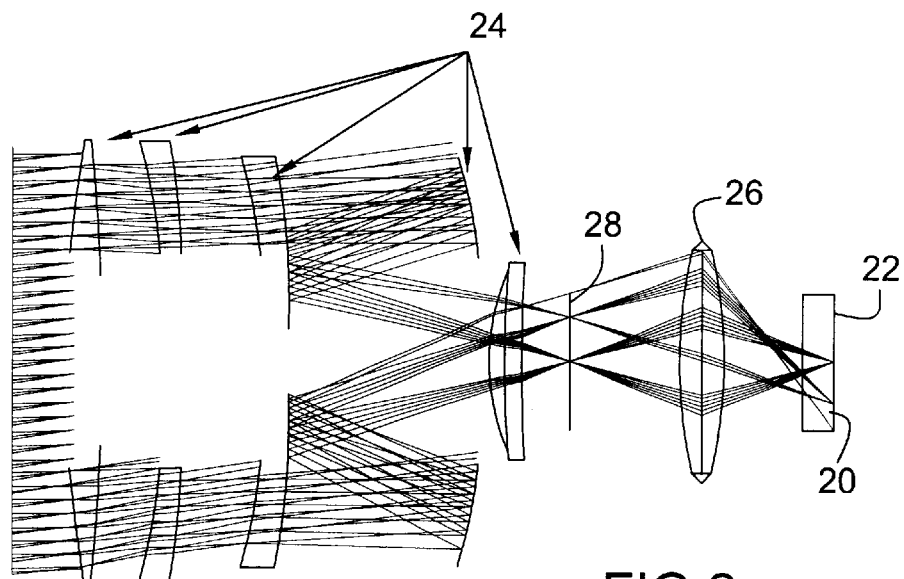
FIG. 2 is a schematic illustration of an embodiment of the invention.

Referring to FIG. 2, a schematic illustration of an embodiment of the invention is depicted. Element 20 is the faceplate of a Gen III tube which has photocathode 22 disposed on its flat inner surface. Lens elements 24 are the fielded objective elements for a Gen II night vision device, is this case belonging to an AN/PVS-4 Small Starlight Scope.

In accordance with the invention, a relay lens 26 is provided between the objective elements and the Gen III input faceplate. As used herein the term "relay lens" means an inverting lens having a 1:1 magnification. The purpose of the relay lens is to collect all of the rays exiting from the device's objective lens and relay them to the photocathode of the Gen III tube. Thus, the same image which is formed at image plane 28, except inverted, is formed on the photocathode 22. At the same time, the relay lens makes up for the length which needed to be provided by a fiber optic twist/extender in the prior art.

Figure 3:
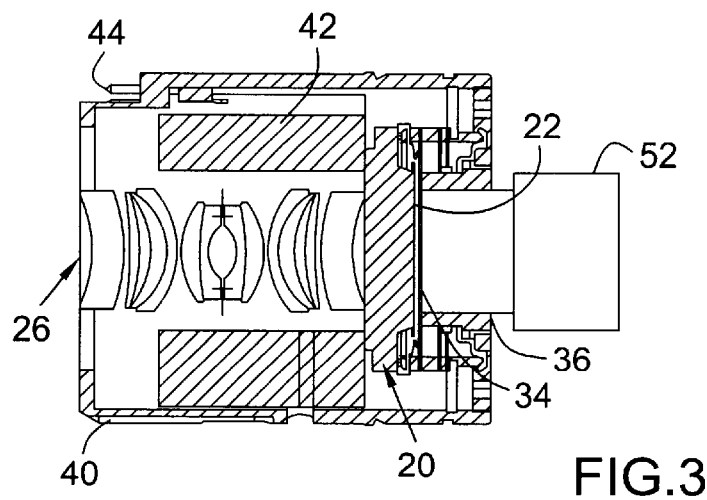
FIG. 3 shows an image intensifier assembly in accordance with the invention.

Referring to FIG. 3, an actual device incorporating the invention is shown. Housing 40 is provided for holding the components of the image intensifier tube in such manner that they are aligned. The specific hardware for effecting such alignment is well known and need not be described herein.

At the right end of the housing is disposed a Gen III image intensifier which includes glass input photocathode 20, (photocathode located on inner surface of glass plate), microchannel plate 34, and screen fiber optic 36, which as is customary, has a phosphor applied to its input end. An eyepiece assembly 52 may be located at the output end of the screen fiber optic, as is customary in such devices.

The relay lens assembly begins at the left end of the housing, and may incorporate multiple optical elements. As has been previously described in connection with FIG. 2, the relay lens forms an inverted version of the image formed by the fielded objective elements of the night vision device, on the photocathode of the image intensifier located on the inner surface of glass plate 20. A power supply 42 is also present as are connectors 44 (one shown) which connect the device to a power source. The image intensifier and relay lens means each has an optical axis and such optical axes are substantially aligned.

The size and location of the various optical elements in the relay lens are dependent on the design of the objectives which are used in the various night vision devices desired to be accommodated. It is preferable for one optical design to work with the various objective arrangements.

A preferred design for the relay lens is as follows:

The majority of 25 mm Gen II tubes were used in AN/PVS-4 Small Starlight Scope, AN/TVS-5 Crew Served Weapon Sight, AN/VVS-2 Combat Vehicle's Driver Viewer and M-30, M-32 and M-36 Combat Vehicle's Gunner's and Commander's Viewers.

The present retrofit invention may be utilized in all of these devices as well as in other devices requiring an image intensifier tube.

What is claimed is:

1. An image intensifier assembly comprising:

a housing, a Generation III image intensifier tube located at one end of the housing, the image intensifier tube having a plate having outer and inner surfaces wherein a photocathode is disposed on the inner surface, and a relay lens means located within the housing separated from the outer surface of the plate for inverting an image formed by an objective lens means which is located outside of the housing and for focusing the image on the inner surface of the plate where the photocathode is disposed.

2. The image intensifier assembly of claim 1 wherein the plate comprises an input plate to the image intensifier tube.

3. The image intensifier assembly of claim 2 wherein the relay lens means is located at the opposite end of the housing from the image intensifier tube.

4. The image intensifier assembly of claim 3 wherein each of the image intensifier and the relay lens means has an optical axis, and wherein such optical axes are substantially aligned.

5. In a night viewing device having an image intensifier assembly positioned between an objective lens means and an eyepiece means, an improved image intensifier assembly, comprising:

a housing, a Generation III image intensifier tube located at one end of the housing, the image intensifier tube having a plate having outer and inner surfaces wherein a photocathode is disposed on the inner surface, and a relay lens means located within the housing separated from the outer surface of the plate for inverting an image formed by the objective lens means and for focusing the image on the inner surface of the plate where the photocathode is disposed.

6. In a viewing device designed for a Generation II image intensifier tube for positioning between an objective lens assembly and an eyepiece assembly within a main housing, a retrofit system for the Generation II image intensifier tube, comprising:

a Generation III image intensifier tube installed at one end of the housing, the image intensifier tube having a plate having outer and inner surfaces wherein a photocathode is disposed on the inner surface, and a relay lens means located within the housing separated from the outer surface of the plate for inverting an image formed by the objective lens assembly and for focusing the image on the inner surface of the plate where the photocathode is disposed.

\* \* \* \* \*

UNITED STATES PATENT AND TRADEMARK OFFICE
CERTIFICATE OF CORRECTION

PATENT NO.      : 6,288,839 B1
DATED           : September 11, 2001
INVENTOR(S)     : John C. Nelson et al.

It is certified that error appears in the above-identified patent and that said Letters Patent is hereby corrected as shown below:

<u>Title page,</u>
Item [75], Inventor, "Janezco" should be changed to -- Janeczko --.

Signed and Sealed this

Twenty-first Day of January, 2003

JAMES E. ROGAN
*Director of the United States Patent and Trademark Office*